June 2, 1936.  L. M. BRUNS  2,042,768
BRACKET FOR AUTO LICENSE TAGS OR THE LIKE
Filed June 21, 1935
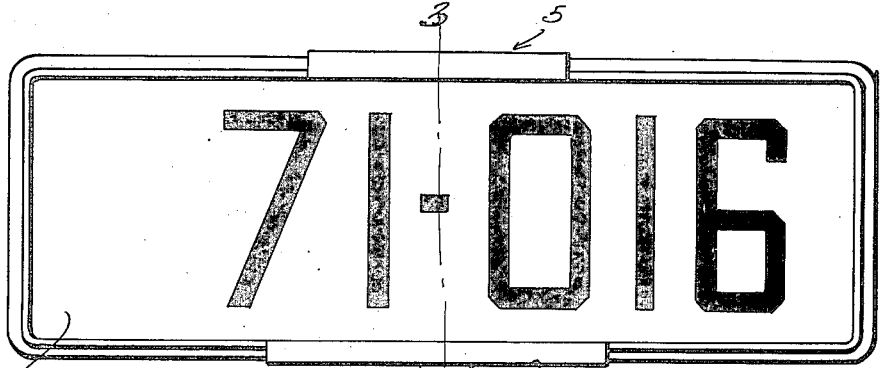
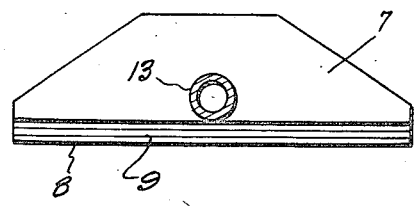
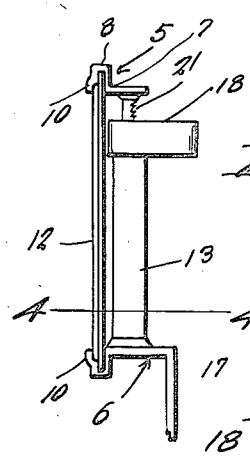
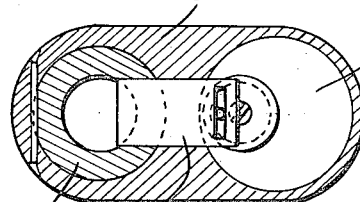
Inventor
Lloyd M. Bruns
By *Clarence A. O'Brien*
Attorney Patented June 2, 1936

2,042,768

UNITED STATES PATENT OFFICE 2,042,768

BRACKET FOR AUTO LICENSE TAGS OR THE LIKE

Lloyd M. Bruns, Wabasso, Minn.

Application June 21, 1935, Serial No. 27,763

5 Claims. (Cl. 40—125)

This invention relates to a bracket or fastening device for automobile license tags or the like and has as its object the provision of such a device characterized by simplicity of application and economy of parts.

Briefly, the invention consists of a pair of complemental members fashioned to clamp between them a license tag or the like, and to readily accommodate themselves to tags of various widths.

Further the invention includes key-controlled means for locking the parts of the clamp together as to prevent unauthorized removal of the license tag from the clamp.

The invention together with its objects and advantages will be best understood from a study of the following description taken in connection with the accompanying drawing wherein:

Figure 1 is a front elevational view illustrating the application of the invention.

Figure 2 is an end elevational view also illustrating the application of the invention.

Figure 3 is a sectional view taken substantially on the line 3—3 of Figure 1.

Figure 4 is a detail view taken substantially on the line 4—4 of Figure 2.

Figure 5 is an enlarged detail sectional view taken substantially on the line 5—5 of Figure 3.

Referring to the drawing by reference numerals it will be seen that the bracket or fastening device comprises a pair of complemental members 5 and 6 respectively; and that each of these members may be fashioned from metal or other suitable material cut, shaped and dimensioned to provide a substantially flat body 7 having at one end a right angularly disposed flange 8 reversely bent upon itself to provide for the flange a channel, 9 whose outer wall at its free edge is slightly offset and transversely curved to provide what may be termed an internally grooved lip 10 adapted to spring into engagement with the bead 11 usually provided slightly inwardly from the marginal edge of the license tag or plate 12.

Provided on the body 7 of the member 6 and secured thereto in any suitable manner is a guide tube 13 while secured to the body 7 of the member 5 in any suitable manner is one end of a guide rod 14 that has on its free end a head 15 having a sliding fit within the guide tube 13.

The free end of the tube 13 is formed to provide a restricted opening through which the rod 14 operates, and also to provide an abutment for one end of a coil spring 16 arranged within the tube 13 and having an end bearing on the head 15 of the rod in a manner to normally urge the head 15 inwardly and the member 5 toward the member 6 so as to clamp between said members in a positive and efficient manner plate 12.

Also, in accordance with the present invention the member 6 has its body 7 equipped with an attaching part or post 17 the same being preferably secured to an edge of the body 7 of the member 6 in any suitable manner, preferably as by being integral therewith so that the entire member 6 may be formed from a single blank.

In actual practice, and as thought to be apparent, an intermediate portion of the upper edge of the license tag or plate 12 is snugly fitted within the channel 9 of the member 5 with the lip 10 of said member 5 snapped into engagement with the bead 11 adjacent the upper edge of the plate 12.

At its lower edge plate 12 is similarly engaged with the member 6, and the spring 16 associated with the guide elements 13 and 14 in the manner shown and before explained tend to urge the members 5 and 6 toward one another to secure said members engaged with the upper and lower edges of the license tag 12 in a positive and efficient manner.

Obviously, part 17 of the device may be bolted or otherwise secured to any suitable part of the automobile, and when once fixed need not be disturbed when a change of license plate or tag is to be made.

For securing the members 5 and 6 at the desired adjustment and in engagement with the license plate 12 against unauthorized removal of the plate there is provided a key controlled lock which consists of a suitable casing 18 having a part 18a adapted to slip down over and to be secured in any suitable manner to the upper end of the guide tube 14, and a second part in which is located a locking dog 19 and suitable key actuated mechanism 20 for operating the dog 19. The dog 19 is projectable into the part 18a and through a slot in the upper portion of the tube 14 for engagement with rack teeth 21 formed on the upper portion of the rod 14. Obviously, as the members 5 and 6 are adjusted relative to one another for clamping the plate 12 therebetween in the manner above described locking dog 19 will swing into engagement with the teeth 21 in a manner to positively secure the parts of the clamp against being unauthoritatively separated so that the license plate 12 is held on the clamp positively and against unauthorized removal. A key or the like will of course be provided for retracting the dog 19 to permit a removal of the plate 12 from the clamp.

Having thus described the invention, what is claimed as new is:

1. A license tag holder comprising a pair of telescopic members, resilient means connected with said members, tending to telescope the members, and a clamping element on the free end of each member, said clamping element including a body plate secured to its respective member, and said body plate at one edge having a flange extended at right angles thereto and reversely bent upon itself to provide a channel adapted to receive an edge of the license tag.

2. A license tag holder comprising a pair of telescopic members, resilient means connected with said members tending to telescope the members, and a clamping element on the free end of each member, said clamping element including a body plate secured to its respective member, and said body plate at one edge having a flange extending at right angles thereto and reversely bent upon itself to provide a channel adapted to receive an edge of the license tag, and said channel having one wall thereof provided with an internal groove to accommodate the bead usually provided adjacent the marginal edge of the license tag.

3. A license tag holder comprising a pair of telescopic members, resilient means connected with said members tending to telescope the members, a clamping element on the free end of each member, one of said telescopic members being provided with teeth, a locking dog mounted on the other telescopic member to engage with the teeth for locking the telescopic members against axial movement relative to one another, and key controlled mechanism for moving the locking dog into and out of engagement with said teeth.

4. In a license tag holder, a pair of complemental members adapted to receive and clamp the license plate therebetween, each of said members including a body portion, a tube on the body portion of one of said members, a guide rod on the body portion of the other of said member and slidably engaged in said tube, a locking device mounted on the free end of said tube and including a key actuated locking dog, and rack teeth on said guide rod with which said locking dog is engageable for securing the clamping members at the desired adjustment against unauthorized separation.

5. A license tag holder comprising a pair of telescopic members, each provided with means for engaging an edge of a license tag for clamping the latter between said members, and interengaging means on said telescopic members to secure said members at the desired adjustment, said means including a lock casing on the outer one of the telescopic members, a key-operated lock in said casing, and said inter-engaging means including an element operatively connected with the lock for either releasing or securing said members together optionally.

LLOYD M. BRUNS.